Figure 1:
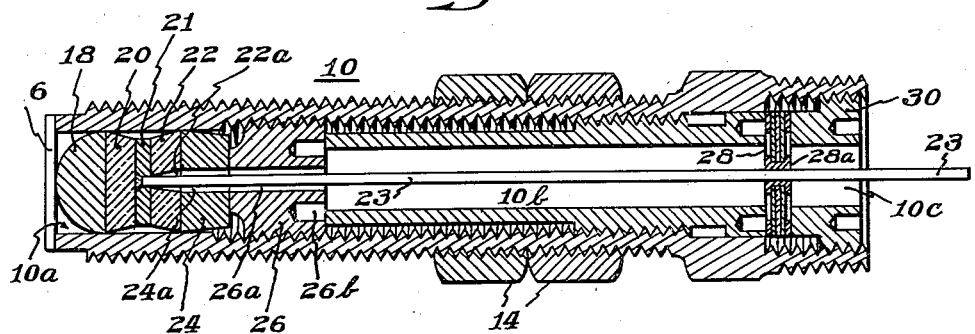

Oct. 26, 1937.    H. J. SCHRADER    2,096,826

PIEZOMETER

Filed Feb. 29, 1936

Inventor
Harold J. Schrader
by
Attorney.

Patented Oct. 26, 1937

2,096,826

UNITED STATES PATENT OFFICE 2,096,826

PIEZOMETER

Harold J. Schrader, Haddon Heights, N. J., assignor to Radio Corporation of America, a corporation of Delaware Application February 29, 1936, Serial No. 66,416

10 Claims. (Cl. 177—351)

This invention relates to piezometers and particularly to apparatus for measuring instantaneous and/or continuously variable pressures by utilization of the so-called piezo-electric properties characteristic of certain crystals, such for instance as quartz, tourmaline, etc.

Piezometers or "piezo-electric gauges" as they are sometimes called find useful application in the automotive, ordnance and small arms industries, among others, where they are employed in conjunction with suitable indicating devices (such for instance as a cathode ray oscillograph) to observe time-pressure phenomena. Usually the instrument itself comprises a cylindrical casing containing two or more parallelly-connected quartz crystals and a pendant plunger one end of which is maintained against the crystal pile, as by a spring, while the body and opposite end of the plunger are inserted in a bore of suitable gauge formed for that purpose in the wall of the pressure-chamber to be examined. The cylinder containing the crystals is provided with a screw arrangement for adjusting the pressure on the crystals and with suitable clamping means for affixing the unit to the exterior of the barrel of a gun or the block of an engine. Preferably the plunger is of a length such that its leading end is flush with the inner wall of the pressure chamber so that it presents no obstruction to the missile and in no-wise alters the volumetric area of the pressure chamber.

An explosion such as one emitted by the firing of a shell or the ignition of a vapor charge exerts a force against the chamber end of the plunger which is transmitted by the plunger through the wall of the chamber to the external crystals which in turn translate this mechanical force into electrical energy in the manner peculiar to piezoelectric substances. The electrical energy thus developed is applied through a suitable amplifier to a cathode ray tube or the like to produce a visual indication for the forces at work within the explosion chamber.

Many valuable advances have been made in various arts as a result of such readings. However, careful analysis of the operation of plunger-type piezometers indicates that the readings are less accurate than is desirable because the plunger (which is necessarily of an appreciable mass) introduces undesirable inertia factors. Further, if, as is usually the case, several conductors are employed to connect the piezo crystals in parallel array the necessary insulation necessitates a more bulky and more complex assembly than is desirable.

An object, therefore, of the present invention is to provide an inertia-less piezometer.

Another object of the invention is to provide a "self-insulating" piezometer.

Another object of the invention is to provide a simple, compact, accurate, inexpensive and trouble-free piezometer.

Figure 2:
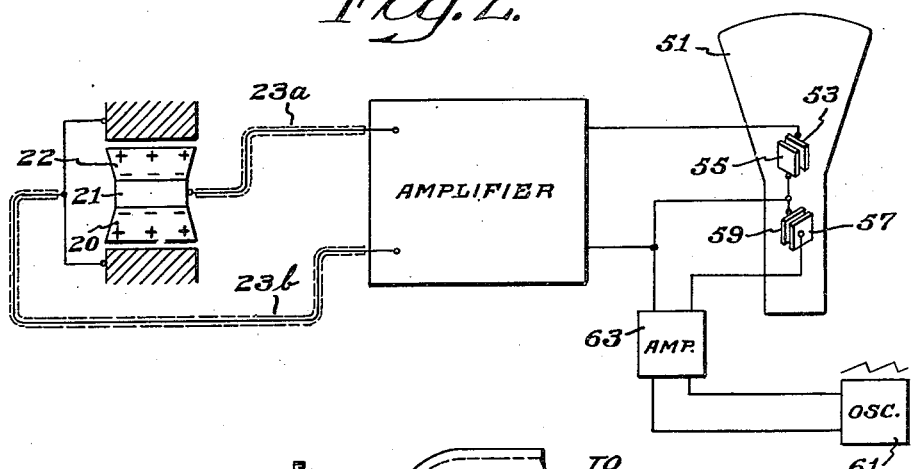
Figure 3:
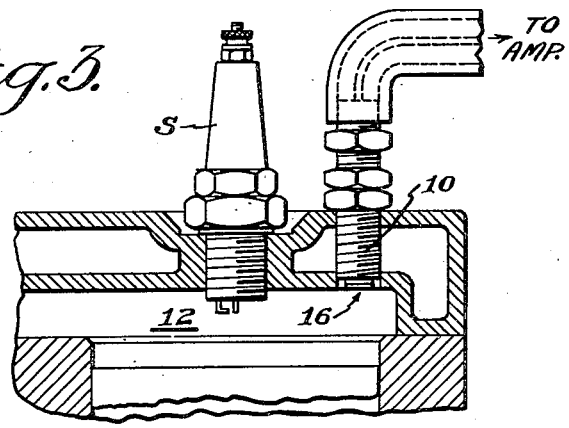

Other objects and advantages will be apparent and the invention itself will be best understood by reference to the following specification and to the accompanying drawing wherein Fig. 1 is a cross-sectional view of a piezometer constructed in accordance with the invention, Fig. 2 is an electrical diagram showing the instrument of Fig. 1 in circuit with an amplifier and cathode-ray oscillograph, and Fig. 3 is a view partly in section showing the instrument of Fig. 1 applied to a cylinder of an internal combustion engine.

In the drawing 10 designates generally a threaded, crystal-containing, casing which is adapted to be screwed into a bore in the wall of a pressure-chamber 12 (Fig. 3). A number of lock-nuts 14 are preferably provided to maintain the casing 10 in position with its leading end flush with the wall of the chamber. The end of casing 10, presented to the interior of this chamber 12, is closed by a diaphragm 16 which may conveniently be constituted by a disc of stainless steel, say $\frac{1}{16}$" thick. Freely mounted within the casing 10 is a metal hemisphere 18 with its curved surface contiguous diaphragm 16, and its plane surface supporting a piezo-electric crystal 20. A second crystal 22, is separated from crystal 20 by a metal electrode 21. Both crystals 20 and 22 are so cut with respect to their natural crystallographic axes that when subject to tension or pressure they will develop electric charges of similar polarity adjacent their respective opposite electrode surfaces. Thus, as indicated in Fig. 2, that electrode face, of each crystal 20, 22 which is contiguous the electrodes 21 are of the same (—) polarity while the charge adjacent the surfaces remote from electrode 21 are each of the opposite (+) polarity. The crystals may of course be so cut that the polarities are reversed, i. e. with the positive polar faces of each crystal toward the electrode 21.

Each of the crystals is cut, in accordance with the invention, in the form of a frustrum of a cone and of a size such that only the perimeter of the larger base of each cone contacts the inner wall 10a of the conductive casing 10. The smaller or "inner" base of the crystals 20, 22, are out of contact with casing 10 so that short-circuiting of the faces of opposite polarity is avoided. Thus casing 10 serves as one (in this case the "positive") of the two necessary external leads of the instrument. The second (in this case the "negative") lead is constituted by a preferably rigid wire or rod 23 which extends through a tapered orifice 22a in crystal 22 and thence along the long axis of casing 10. As shown in Fig. 1 rod 23 connects with electrode 21 adjacent the small end of the tapered orifice 22a and passes through crystal 22 without contacting that portion of its body and surface in which electric charges of opposite (in this case "positive") polarity accumulate. This arrangement prevents short-circuiting of the faces of opposite polarity by the rod 23.

A backing plate 24 and a pressure assembly nut 26 are provided for maintaining the crystal elements 20, 22, under moderate tension against the hemisphere 18, which in turn, is pressed against the diaphragm 16. The adjustment need not be critical, it is made during assembly by means of a wrench having prongs adapted to engage the sockets 26b in nut 26. Both the backing plate 24 and nut 26 are provided with aligned orifices, designated 24a, 26a, respectively, which form a continuation of the crystal orifice 22a and through which the lead rod 23 enters the central hollow portion 10b of the cylinder 10. Rod 23 is out of contact with the surrounding metal. The upper end of the cylinder 10 is preferably hermetically sealed as by means of a seal constituted by an insulating washer 28 of laminated mica having a central metal eyelet 28a in which lead wire 23 is soldered. This seal is conveniently held in place by means of a threaded nut 30. The space 10c about the washer 28 is further sealed by a filling of glyptol or other high-temperature insulating cement.

The casing or shell 10, the diaphragm 16, the hemisphere 18 and the central electrode 21 are preferably formed of stainless steel. Since the temperature coefficient of expansion of the quartz elements 20, 22 is less than that of steel, the assembly might tend to loosen when subject to comparatively high temperatures unless some compensating means is provided. Accordingly, the backing plate 24 is formed of brass or the like to compensate for such unequal expansion. This plate 24 is shaped with its side walls sloping inwardly out of full length contact with the inner wall 10a of the casing or shell 10 to obviate "sticking" and to facilitate assembly.

With the device 10 of Fig. 1 positioned, for instance, in the wall of a cylinder 12 of an internal combustion engine (Fig. 3) the pressure force of an explosion initiated as by a spark-plug "S" will be exerted against the diaphragm 16, hemisphere 18 and the crystal assembly 20, 21, 22. As shown in the electrical diagram of Fig. 2 and as previously set forth the crystals are assembled with their faces of similar polarity in contact with electrode 21, hence the charges of like sign will be added. The sum of the combined negative charges are transferred from electrode 21 through lead rod 23 (Fig. 1) and shielded cable 23a (Figs. 2 and 3) to a suitable amplifier (Fig. 2). The circuit is completed through a common connection 23b from the opposite positively polarized faces of the crystals 22, 23 which are in contact with the shell 10. The amplifier potentials are preferably impressed upon the vertical deflecting plates 53, 55 of a cathode-ray oscillograph 51. The tube illustrated is provided with a pair of horizontal deflecting plates 57—59 which are energized, for the purpose of providing a time-axis, by a saw-tooth oscillator 61 and amplifier 63. Preferably, the frequency of oscillator 61 is adjusted to synchronism with the frequency of the cylinder explosions to provide a relatively stationary image upon the fluorescent end of the cathode-ray tube 51.

The small mass of the hemisphere 18 ensures minimum inertia, this feature together with the other features of novelty of the self contained, self-insulated, hermetically sealed piezometer of the invention ensure an accurate indication of the time-pressure phenomena taking place in the pressure chamber to which it is applied.

As other applications and embodiments of the invention will suggest themselves to those skilled in the art, it is to be understood that the scope of invention is not to be limited except as required by the prior art and by the spirit of the appended claims.

I claim:

1. In combination a quartz piezo-electric element having oppositely polarized electrode faces lying in parallel planes, an orifice in said quartz element extending in a direction normal to the planes in which said polarized electrode faces lie, an electrode adjacent one of said polarized electrode faces and a conductive lead from said electrode extending through said orifice out of contact with the other of said polarized faces.

2. The invention as set forth in claim 1 characterized in that said orifice is tapered in cross section and said conductor connects with said electrode adjacent the small end of said orifice.

3. In a device of the class described, a hollow electrically conductive member, a piezo-electric element therein having oppositely polarized electrode faces, the inner wall of said conductive member contacting said element adjacent only one of its said polarized faces.

4. The invention as set forth in claim 3 characterized in that said piezo-electric element is in the form of a frustrum of a cone.

5. In a device of the class described, a hollow electrically conductive member, a pair of piezo-electric elements therein each having oppositely polarized electrode faces, an electrode interposed between similarly polarized of said electrode faces, the perimeters of certain of said polarized faces contacting the inner wall of said conductive member and the perimeters of the other of said polarized faces and of said electrode being out of contact with said wall.

6. In a device of the class described, a hollow electrically conductive member, a pair of piezo-electric elements therein each having oppositely polarized electrode faces, an orifice in one of said elements, an electrode interposed between similarly polarized of said electrode faces, a conductor connected to said electrode and extending through said orifice out of contact with the other polarized face of said orificed element.

7. The invention as set forth in claim 6 characterized in that said other polarized face of said orificed piezo-electric element and the corresponding face of the other piezo-electric element connect with said hollow member whereby said member constitutes a return lead for electric charges appearing upon the faces of said elements which are adjacent said electrode.

8. In a device of the class described, a hollow electrically conductive member, a pair of piezo-electric elements each of frusto-conical form and having corresponding electrode faces similarly polarized, the perimeters of the bases of each element contacting the inner wall of said hollow member, an electrode interposed between the small ends of said frusto-conical elements out of contact with said inner wall, an orifice in one of said elements, a conductor connected to said electrode and extending through said orifice to the exterior of said hollow member out of contact with the base of said orificed element and the inner wall of said hollow member.

9. A piezometer comprising an electrically conductive cylinder, a diaphragm closing the leading end of said cylinder, a pressure transfer member contacting the inner wall of said cylinder and said diaphragm, a pair of frusto-conical piezoelectric elements and an interposed electrode, the base of one of said elements contacting said pressure transfer member and the perimeter of the base of each element contacting the inner wall of said cylinder, the small ends of said elements and said electrode being out of contact with said wall, a second electrode adjacent the base of the element which is remote from said diaphragm, and a conductor extending from said first mentioned electrode through said last mentioned piezo-electric element and through said second mentioned electrode to the exterior of said cylinder and out of contact with said element, second electrode and cylinder.

10. The invention as set forth in claim 9 wherein said cylinder, said pressure transfer member and said first mentioned electrode are composed of a material having a certain coefficient of expansion and said piezo-electric elements and said second electrode are composed of materials having a combined coefficient of expansion which is not less than that of said first mentioned coefficient of expansion.

HAROLD J. SCHRADER.